United States Patent [19]
Butcher

[11] 3,970,919
[45] July 20, 1976

[54] REGULATING DIGITAL POWER SUPPLY
[75] Inventor: Daryl T. Butcher, La Habra, Calif.
[73] Assignee: The United States of America as represented by the Secretary of the Air Force, Washington, D.C.
[22] Filed: June 19, 1975
[21] Appl. No.: 588,735

[52] U.S. Cl. .................................. 323/19; 323/39
[51] Int. Cl.² ........................................ G05F 1/10
[58] Field of Search .................. 323/19, 39, 43.5 S, 323/DIG. 1; 321/47

[56] References Cited
UNITED STATES PATENTS
| | | | |
|---|---|---|---|
| 3,691,452 | 9/1972 | Aguiar | 323/19 |
| 3,735,241 | 5/1973 | O'Sullivan | 321/47 |
| 3,818,321 | 6/1974 | Willner et al. | 323/43.5 S |

OTHER PUBLICATIONS
"A–D Transistor Switching Regulator Controller" by Calvo et al. IBM Tech. Disc. Bull. vol. 17, No. 9 Feb. 1975 pp. 2666, 2667.

Primary Examiner—Gerald Goldberg
Attorney, Agent, or Firm—Joesph E. Rusz; Julian L. Siegel

[57] ABSTRACT

A regulating digital power supply in which an error detector compares a reference signal voltage with an unknown loop signal voltage and upon being strobed the error detector outputs a signal depending upon the relative magnitude of the two input signals. This output signal controls the direction of count of an up/-down counter that counts clock pulses. At appropriate intervals as controlled by the clock, the contents of the up/down counter are transferred to a down counter upon a command signal which also sets a flip-flop. When the down counter reaches zero and overflows it emits a signal that resets the flip-flop, the output thereof being a pulsewidth modulated regulated power supply. The flip-flop also controls a switch to a power source that is rectified and filtered and then fed back to the error detector comparator, thereby completing the loop.

3 Claims, 2 Drawing Figures

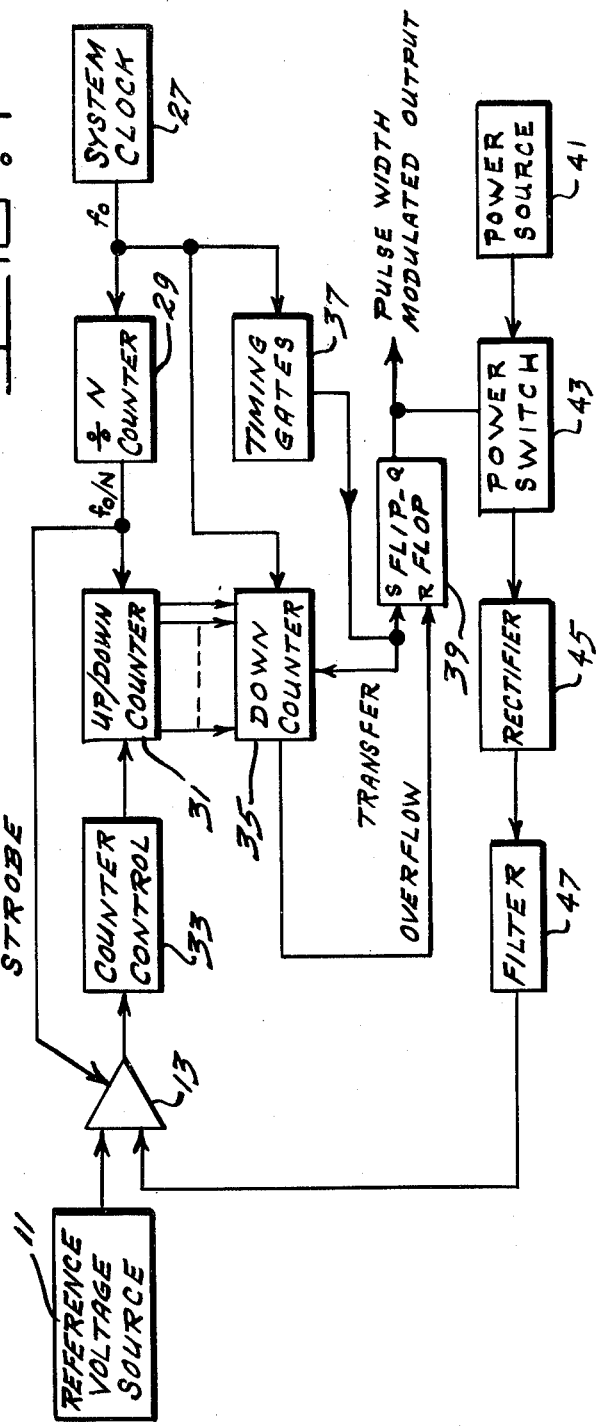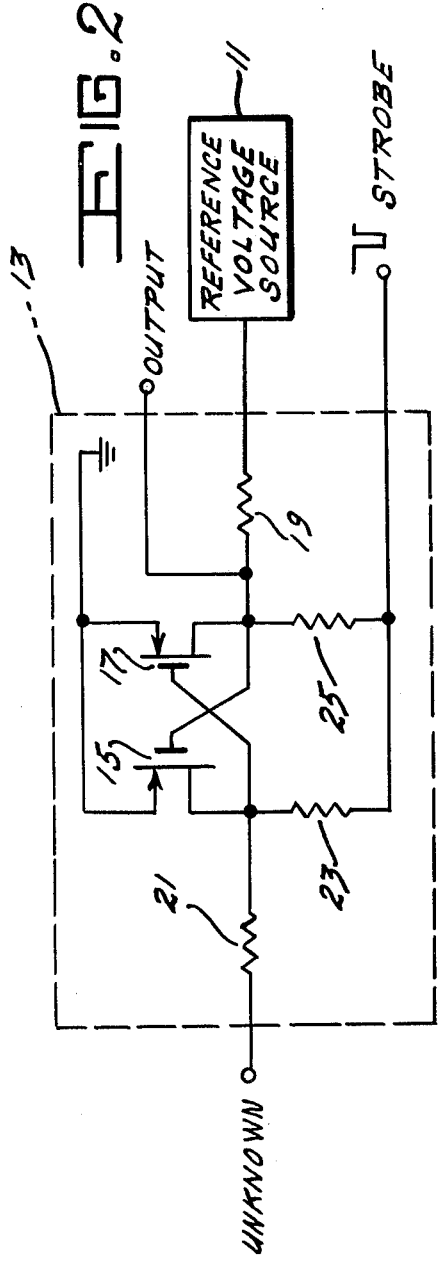

REGULATING DIGITAL POWER SUPPLY

STATEMENT OF GOVERNMENT INTEREST

The invention described herein may be manufactured and used by or for the Government for governmental purposes without the payment of any royalty thereon.

BACKGROUND OF THE INVENTION

This invention relates to regulated power supplies, and more particularly to a digital power supply regulator using pulse counts and a feedback servo loop.

Analog MOS circuitry is extremely sensitive to radiation and there are undesirable results when not placed in a suitable radiation-free environment. The present invention is a regulated power supply but instead of using conventional analog techniques that have high sensitivities to radiation, a digital system is disclosed which is relatively insensitive to radiation.

SUMMARY OF THE INVENTION

A pair of transistors regenerates with one or the other conducting with the opposite being in the off state. Their states depend on the relative magnitude of an unknown loop voltage and a reference voltage, the regenerating output occurring each time a strobe pulse is applied. At each comparison or strobe pulse, an up/down counter is incremented (unknown less than reference) or decremented (reference less than unknown) and the contents of this register is transferred to a down counter and a flip-flop is set. A clock pulse with a repetition rate N times the strobe pulse rate is used to decrement the down counter until the zero count is past and an overflow occurs which resets the flip-flop. The width of the flip-flop output pulse is therefore controlled by the number contained in the up-down counter which is in turn controlled by the relative magnitude of the unknown and reference voltage. If the flip-flop pulsewidth is used to control or modulate a power inverter whose output is the unknown input to the comparator, a feedback loop is established. This loop causes the up/down counter number to converge on a value where the unknown and reference are equal within quantization errors. A servo loop for a digital power supply (or other application) can then be realized.

It is therefore an object of this invention to provide a novel and improved regulator digital power supply with greater efficiency than those used in the past.

It is another object to provide a regulated power supply having a pulsewidth modulated output signal.

It is still another object to provide a regulator power supply that has minimum sensitivity to radiation, unlike analog MOS circuitry that is extremely sensitive to radiation.

These and other objects, features and advantages of the invention will become more apparent from the following description taken in conjunction with the illustrative embodiment in the accompanying drawings, wherein:

DESCRIPTION OF THE DRAWINGS

FIG. 1 is a block diagram showing an embodiment of the regulated digital power supply which is the subject of the present invention; and FIG. 2 is a circuit diagram of the comparator used as an error detector in the embodiment of FIG. 1.

DETAILED DESCRIPTION OF THE PREFERRED EMBODIMENT

Referring to FIG. 1, it can be seen that a reference voltage from reference source 11 is compared with another voltage which is the unknown voltage. The reference voltage can be any convenient DC voltage and the unknown voltage is obtained from the circuit loop. The reference voltage from source 11 and the unknown loop voltage are fed to comparator 13. This circuit is an error detector which produces a particular output voltage depending upon which of the two voltages, the reference voltage or the loop voltage, has the greater magnitude. The output voltage showing the direction of error is only produced if comparator 13 is strobed by a pulse originating from a clock source.

In FIG. 2, there is shown details of comparator 13. A pair of transistors 15 and 17 are interconnected with the gate of transistor 15 being connected to the drain of transistor 17 and the base of transistor 17 being connected to the collector of transistor 15. The sources of both transistors 15 and 17 are connected to ground. The reference voltage from source 11 is connected through resistor 19 to the collectors of transistors 15 and 17 and the unknown loop voltage is also connected to the drains of transistors 15 and 17 but through resistor 21. The strobe pulse is applied to the collectors through parallel resistors 23 and 25. When the circuit is strobed and depending on the relative magnitude of the loop voltage and the reference voltage, transistor 15 will be cut off and transistor 17 will conduct, or, transistor 17 will be cut off and transistor 15 will conduct. These conditions will result in a power output voltage taken at the collector of transistor 17.

Pulses are produced from clock 27 which has the frequency $f_o$ and are fed to frequency divider 29 which can be a counter. This circuit divides by N and output pulses are generated having a frequency of $f_{o/N}$ which both pulses up/down counter 31 and strobes comparator 31. At each comparison of the reference voltage and the loop voltage which occurs at each strobe pulse from divider 29, an output signal is fed to counter control 33 which causes counter 31 to count selectively either up or down. If the loop voltage is less than the reference voltage, then the counter 31 will be incremented; if the reference voltage is less than the loop voltage, counter 31 will be decremented. Each output stage of the up/down counter 31 is connected to corresponding stages of down counter 35. The contents of up/down counter 31 is transferred to down counter 35 upon a transfer pulse from clock 27 through timing gates 37. These timing gates are controlled through clock 27 and can be a delay. At the same time that the contents of up/down counter 31 are transferred to down counter 35, flip-flop 39 is set. A pulse from clock 27, having a frequency $f_o$ or N times the frequency of the strobe pulse, decrements down counter 35 until an overflow occurs, indicating that down counter 35 has passed the zero count. A signal from down counter 35, as a result of the overflow, resets flip-flop 39. The width of the output of flip-flop 39 is therefore controlled by the number contained in up/down counter 31 which in turn is controlled by the relative magnitude of the reference voltage and the loop voltage. Flip-flop 39 modulates the signal from power source 41 by activating power switch 43 which controls the signal to rectifier 45 followed by filter 47. The output of filter 47 is then fed back to comparator 13 completing the loop. Thus a feedback loop is established which causes up/down counter 31 to converge on a value where the loop voltage and the reference voltage are equal within the quantization errors. The digital output is taken from flip-flop 39 which is a signal modulated by pulsewidth.

What is claimed is:

1. A regulated digital power supply system comprising:
   a. a clock;
   b. a frequency divider fed by the clock;
   c. means for comparing a reference signal with an unknown signal upon application of a strobe pulse from the frequency divider;
   c. a first means for counting pulses, the first counting means counting the pulses from the frequency divider and being fed by a signal from the comparing means for controlling selectively the direction of the count;
   d. a second means for counting pulses, the second counting means counting pulses from the clock in the down direction and being fed by the contents of the first counting means upon a transfer command signal through the clock;
   e. a flip-flop being set by the transfer command signal and reset by the second counting means upon reaching an overflow, the output of the flip-flop being the regulated power supply;
   f. a source of power; and
   g. a power switch interposed between the source of power and the comparing means and activated by the flip-flop for controlling the magnitude of the unknown signal.

2. A regulated digital power supply system according to claim 1 wherein the comparing means comprises first and second transistors having grounded sources and the gate of each transistor being connected to the drain of the other transistor and with the reference signal, the unknown signal, and the strobe pulse being resistively applied to the collectors.

3. A regulated digital power supply system according to claim 2 which further comprises:
   a. a rectifier; and
   b. a filter fed by the rectifier, with the rectifier and the filter being interposed between the power switch and the comparing means.

* * * * *